US009433052B1

(12) United States Patent
Chang et al.

(10) Patent No.: US 9,433,052 B1
(45) Date of Patent: Aug. 30, 2016

(54) LED CONTROL SYSTEM SUITABLE FOR DIFFERENT TYPES OF POWER SOURCES

(71) Applicant: Alfasemi Inc., Taipei (TW)

(72) Inventors: Yu-Cheng Chang, Cupertino, CA (US); Te-Lung Shih, Taipei (TW)

(73) Assignee: ALFASEMI INC., Taipei (TW)

( * ) Notice: Subject to any disclaimer, the term of this patent is extended or adjusted under 35 U.S.C. 154(b) by 0 days.

(21) Appl. No.: 14/990,827

(22) Filed: Jan. 8, 2016

(51) Int. Cl.
*H05B 33/08* (2006.01)

(52) U.S. Cl.
CPC ...... *H05B 33/0845* (2013.01); *H05B 33/0884* (2013.01)

(58) Field of Classification Search
CPC .......... H05B 33/0815; H05B 33/0845; H05B 33/0884
See application file for complete search history.

(56) References Cited

U.S. PATENT DOCUMENTS

| 2006/0033482 A1* | 2/2006 | Florence | H02M 3/158 323/267 |
| 2013/0099684 A1* | 4/2013 | Cheng | H05B 33/0818 315/186 |
| 2015/0022115 A1* | 1/2015 | Hast | H05B 33/0818 315/294 |
| 2015/0115809 A1* | 4/2015 | Siessegger | H05B 33/0803 315/185 R |
| 2016/0007416 A1* | 1/2016 | Viviani | H05B 33/083 315/200 R |

* cited by examiner

*Primary Examiner* — Jany Richardson
(74) *Attorney, Agent, or Firm* — Bacon & Thomas, PLLC (57) ABSTRACT

An LED control system, comprising: a power source; an LED connected to the power source; a first switch connected in series with the LED; a second switch connected in parallel with the LED; a first regulation module including the first path to regulate a power applied to the LED; a second regulation module sharing the first path with the first regulation module to regulate the power applied to the LED; a check module to detect an energy value on a node of the LED control system; and a control module connected to the power source check module, the first regulation module, and the second regulation module; wherein when the check module detects that the energy value on the node is greater than a predefined value, the control module disables the regulation module in operation and enables the other regulation module.

19 Claims, 11 Drawing Sheets

LED CONTROL SYSTEM SUITABLE FOR DIFFERENT TYPES OF POWER SOURCES

BACKGROUND OF THE INVENTION

1. Field of the Invention

The present invention relates to a control system, and more particularly, to an LED control system.

2. Description of Related Art

In recent years, Light Emitting Diode (LED) has been widely used in various lighting applications. The power for lighting an LED is provided by a power source. Currently, the power applied to the LED is regulated by a certain regulation circuit, e.g. an LDO (Low-dropout) circuit, a buck circuit, a boost circuit, a fly-back circuit, a SEPIC (single-ended primary-inductor converter) circuit, or a CUK circuit to prevent the LED from being damaged by the excess power provided by the power source.

Figure 1A:
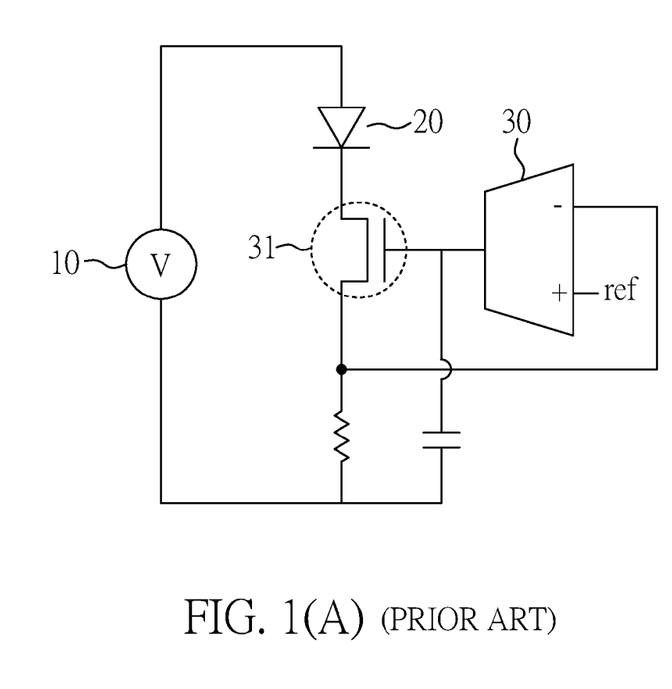
FIG. 1(A) is a schematic diagram illustrating a typical LDO circuit for a voltage source.

FIG. 1(A) shows a typical LDO circuit for a voltage source. As shown in FIG. 1(A), a voltage source 10 is connected to an LED 20. The LED 20 is connected in series with a transistor 31 on a current path. An operational transconductance amplifier (OTA) 30 changes the resistance of the transistor 31 to regulate the LED current. Besides, the buck circuit, boost circuit, fly-back circuit, SEPIC circuit, or CUK circuit can also provide the same effect.

Figure 1B:
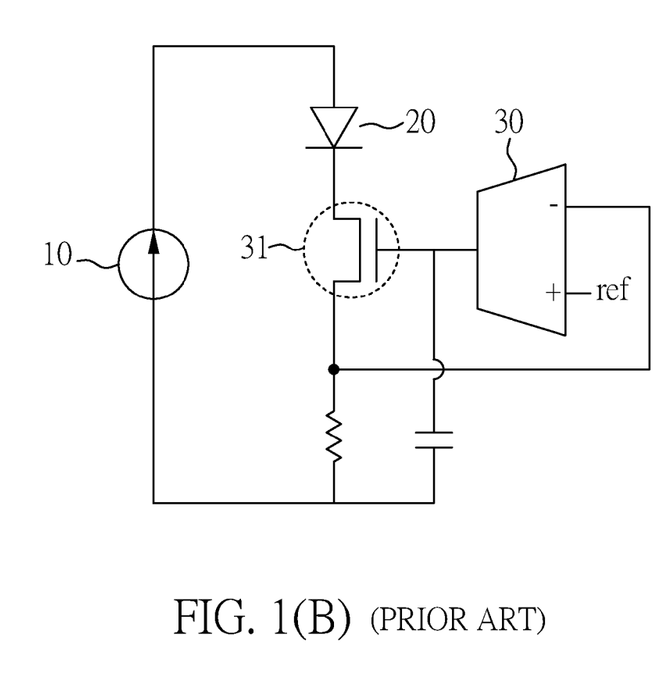
FIG. 1(B) is a schematic diagram illustrating a typical LDO circuit for a voltage source connected to a current source.

However, if a regulation circuit for a voltage source is connected to a current source, the regulation circuit may not operate normally. FIG. 1(B) shows a typical LDO circuit suitable for a voltage source but connected to a current source. As shown in FIG. 1(B), if current source 10 provides more current than desired, although the resistance of the transistor 31 is changed, the un-consumed current generates the extra high voltage on the drain of transistor 31 and could damage the transistor 31. Similarly, if a regulation circuit suitable for a current source is connected to a voltage source, an erroneous current will be consumed on the regulation circuit. As a result, the LED or the regulation circuit is likely to be damaged if an incorrect regulation circuit is used.

Therefore, there is a need to provide an improved LED control system capable of detecting whether the regulation circuit in operation is suitable for the type of power source in operation in order to solve the aforementioned problem.

SUMMARY OF THE INVENTION

An object of the present invention is to provide an LED control system, which comprises: a power source; an LED connected to the power source; a first switch connected in series with the LED; a second switch connected in parallel with the LED; a first regulation module including the first switch to regulate a power applied to the LED; a second regulation module including the second switch to regulate the power applied to the LED, wherein an operating period of the first regulation module and an operating period of the second regulation module are not overlapped with each other; a check module to detect an energy value on a node of the LED control system (to detect a power applied to the LED under the control of the regulation module in operation); and a control module connected to the check module, the first regulation module, and the second regulation module; wherein when the check module detects that the energy value on the node is greater than a predefined value, the control module disables the regulation module in operation and enables the other regulation module. Thus, when the regulation module in operation is not suitable for the type of power source in operation, the check module can detect an erroneous energy value (power value or signal value) generated in the LED control system. The control module can enable the other regulation module to allow the LED control system to operate normally.

Another object of the present invention is to provide an LED control system, which comprises: a power source; an LED connected to the power source; a first switch connected in series with the LED; a second switch connected in parallel with the LED; a first regulation module including the first switch to regulate a power applied to the LED; a second regulation module including the second switch to regulate the power applied to the LED, wherein an operating period of the first regulation module and an operating period of the second regulation module do not overlapped with each other; a first check module to detect an energy value on a first node of the LED control system (i.e. to detect a power applied to the LED under the control of the first regulation module); a second check module to detect an energy value on a second node of the LED control system (i.e. to detect a power applied to the LED under the control of the second regulation module); and a control module connected to the first check module, the second check module, the first regulation module, and the second regulation module; wherein when the first check module detects that the energy value on the first node is greater than a first predefined value, the control module disables the first regulation module and enables the second regulation module, and when the second check module detects that the energy value on the second node is greater than a second predefined value, the control module disables the second regulation module and enables the first regulation module. Hence, when the regulation module in operation is not suitable for the type of power source in operation, one of the check modules can detect an erroneous energy value (power value or signal value) generated in the LED control system. The control module can enable the other regulation module. After switching to the different regulation module, if the type of power source in operation is changed again, the other check module can detect another erroneous power generated in the LED control system. The control module can enable the original regulation module again to allow the LED control system to operate normally.

DETAILED DESCRIPTION OF THE PREFERRED EMBODIMENT

Figure 2:
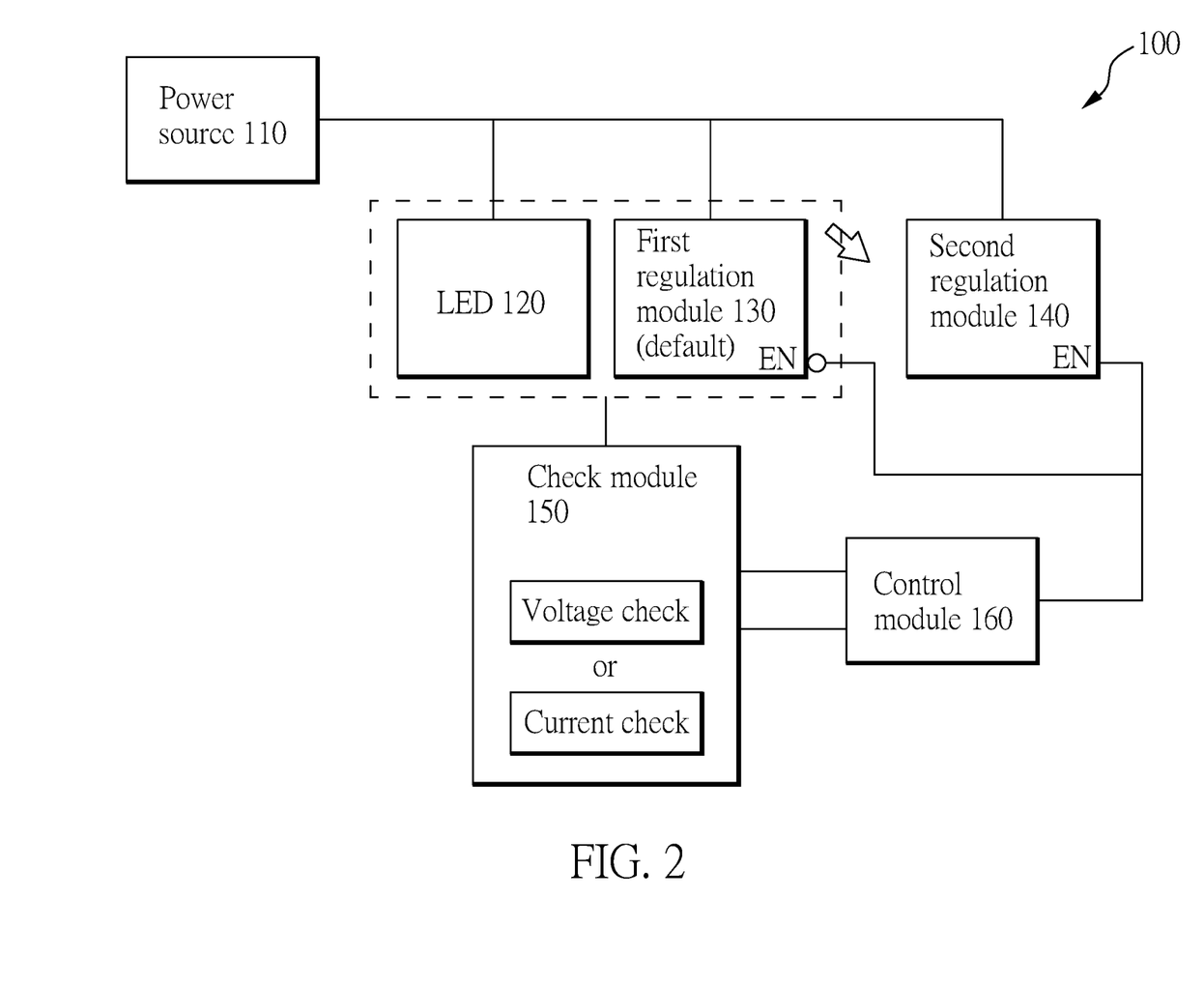
FIG. 2 is a schematic diagram illustrating a first system framework of an LED control system according to the present invention.

FIG. 2 is a schematic diagram illustrating a first system framework of an LED control system according to the present invention. As shown in FIG. 2, the LED control system 100 includes a power source 110, an LED 120, a first regulation module 130, a second regulation module 140, a check module 150, and a control module 160. The power source 110 is used to provide a power for lighting the LED 120. The first regulation module 130 and the second regulation module 140 are used to regulate a power applied to the LED 120. An operating period of the first regulation module 130 and an operating period of the second regulation module 140 are not overlapped with each other. For example, during the operating period of the first regulation module 130, the second regulation module 140 is disabled, and vice versa. The control module 160 is connected to the check module 150, the first regulation module 130, and the second regulation module 140.

The type of power source 110 can be a voltage source or a current source. The first regulation module 130 and the second regulation module 140 are suitable for different types of power source 110. When the check module 150 detects that the regulation module in operation is not suitable for the type of power source 110 in operation, the control module 160 enables the other regulation module. The check module 150 can be a voltage check module for checking an erroneous voltage in the LED control system 100. Alternatively, the check module 150 can be a current check module for checking an erroneous current in the LED control system 100.

Figure 3:
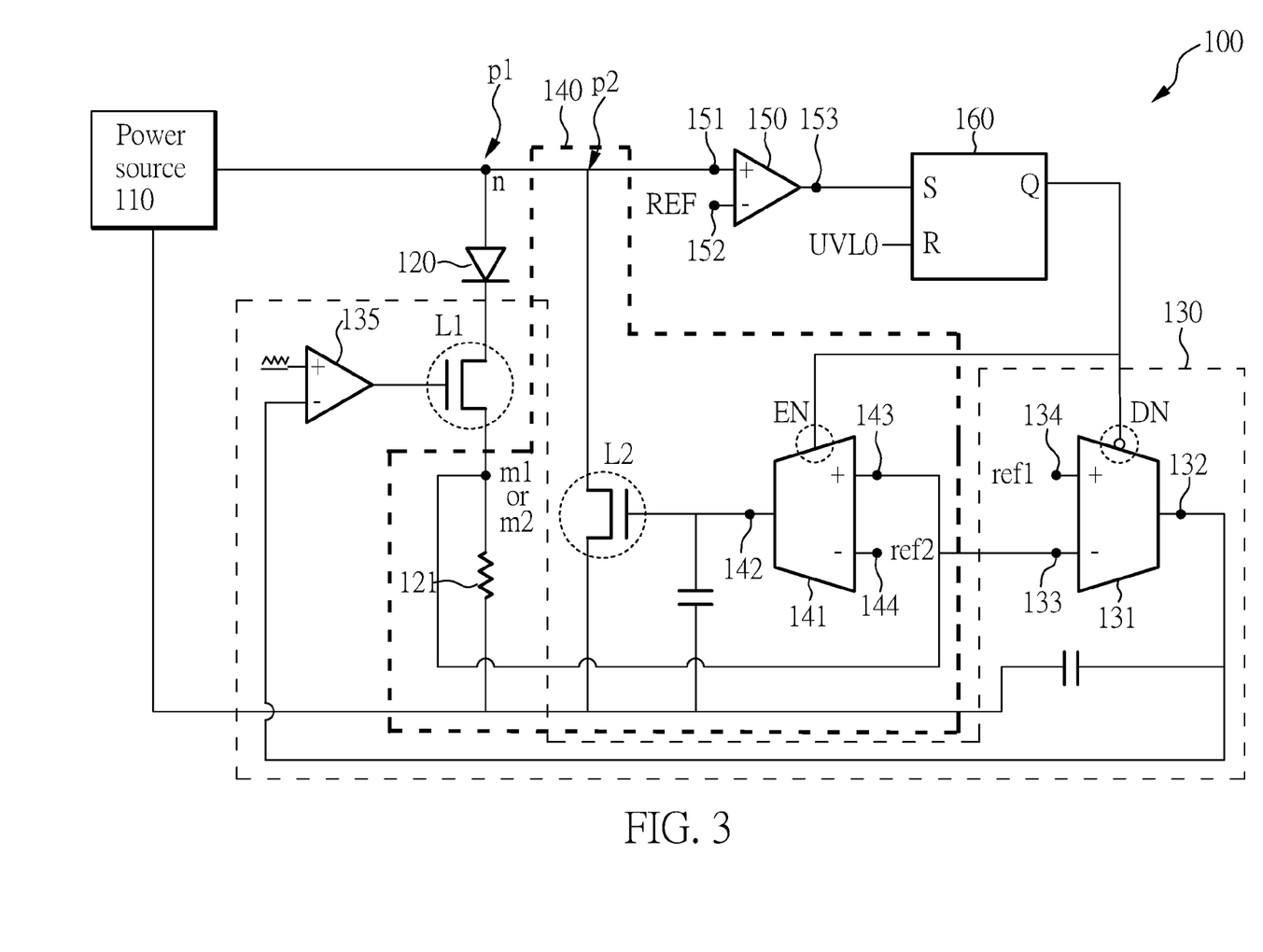
FIG. 3 is a schematic diagram illustrating a preferred circuit structure of the first system framework of an LED control system according to the present invention.

FIG. 3 is a schematic diagram illustrating a preferred sample circuit structure of the first system framework of an LED control system according to the present invention. As shown in FIG. 3, an LED 120 is disposed on a first path p1. The LED 120 is connected to a power source 110. The LED 120 has an anode and a cathode, wherein the anode is connected to a positive terminal of the power source 110, and the cathode is connected to a first terminal of a first switch L1 disposed on the first path p1. A second terminal of the first switch L1 is connected to a negative terminal of the power source 110 through a resistor. The LED 120 is connected in series with the first switch L1 on the first path p1.

The first path p1 is defined as a current path passing through the LED 120, the first terminal and the second terminal of the first switch L1 and a resistor 121. The second path p2 is a current path passing through the first terminal and the second terminal of the second switch L2.

The first switch L1 is directly or indirectly under control of an output terminal 132 of a first monitor module 131. The first monitor module 131 has two input terminals including an input terminal 133 and a reference input terminal 134. The input terminal 133 is connected to a first monitor node m1 of the first path p1 to receive a power applied to the first monitor node m1. The power applied to the first monitor node m1 is compared with a first reference value ref1 inputted to the reference input terminal 134. If the power applied to the first monitor node m1 is greater than the first reference value ref1 134, it means more power is going to LED 120 and the excess power provided by the power source 110 may damage the LED 120. Accordingly, at this moment, the first monitor module 131 outputs a first regulation signal to regulate the power applied to the LED 120. Besides, in this embodiment, a comparator 135 is between the output terminal 132 and the first switch L1. Preferably, the output terminal 132 controls the first switch L1 indirectly because the comparator 135 itself converting the output terminal 132 into a series of high/low signals really turning on/off the first switch L1 to adjust LED power.

In this embodiment, the first regulation module 130 is combined by the first monitor module 131, the comparator 135 and the first switch L1, it means the first switch L1 is in switch mode. In switch mode, the power applied to the LED 120 can be regulated by changing duty cycle of the first switch L1 according to the first regulation signal. In other words, the first regulation module 130 can regulate the power applied to the LED 120 by means of changing the first switch L1 on/off ratio.

Preferably, the first regulation module 130 is a regulation circuit suitable for a voltage source because the LED 120 and the first switch L1 are connected in series. The first switch L1 includes at least a transistor. The third terminal of the first switch L1 is a gate terminal. The first monitor module 131 includes at least an amplifier. In the current embodiment, the first regulation module 130 is a switch circuit. However, in other embodiments, the first regulation module 130 can be a LDO, buck circuit, a boost circuit, a fly-back circuit, a SEPIC circuit, or a CUK circuit and the according inductors or transformers should be included.

Referring to FIG. 3 again, a part of the first path p1 is shared by the second regulation module 140 and the first regulation module 130. The second regulation module 140 further includes a second path p2. The first path p1 is connected in parallel with the second path p2. A second switch L2 is disposed on the second path p2. The second switch L2 includes a first terminal, a second terminal, and a third terminal. The third terminal of the second switch L2 is directly or indirectly connected to an output terminal 142 of a second monitor module 141. The second monitor module 141 controls the second switch L2. Precisely, the first switch L1 and the LED 120 are connected in series in the first path p1, and the second switch L2 disposed in the second path p2 are connected in parallel with the LED 120.

Similar to the first monitor module 131, the second monitor module 141 also has an input terminal 143 and a reference input terminal 144. The input terminal 143 is connected to sense the power applied to the LED 120. The sense result from the second monitor node m2 is compared with a second reference value ref2. If the power applied to the second monitor node m2 is greater than the second reference value ref2 144, it means more power is going to LED 120, the excess power provided by the power source 110 may damage the LED 120. Consequently, at this moment, the second monitor module 141 outputs a second regulation signal to regulate the power applied to the LED 120.

In this embodiment, the second regulation module 140 is combined by the second monitor module 141 and the second switch L2. Since the output terminal 142 controls the second switch L2 directly, it means the second switch L2 is in linear mode. In linear mode, the power applied to the LED 120 can be regulated by providing the second regulation signal to control the resistance of the second switch L2.

It is noted that the first switch L1 is in switch mode and the second switch L2 is in linear mode in FIG. 3 in this embodiment. But in other embodiments, both the first switch L1 and the second switch L2 can be in switch mode when another comparator is added between the second switch L2 and the second monitor module 141. Or, both the first switch L1 and the second switch L2 can be in linear mode when the comparator between the first switch L1 and the first monitor module 131 is removed.

In this embodiment, the first monitor node m1 is the same as the second monitor node m2 The first reference value ref1 is the same as the second reference value ref2. Alternatively, in other embodiments, the first monitor node m1 may be different from the second monitor node m2 The first reference value ref1 may be different from the second reference value ref2.

Preferably, the second regulation module 140 is a regulation circuit suitable for a current source because the second switch L2 is connected in parallel with the LED120. The second switch L2 includes at least a transistor. The third terminal of the second switch L2 is a gate terminal. The second monitor module 141 includes at least an amplifier. In the current embodiment, the second regulation module 140 is an LDO circuit. In other embodiments, the second regulation module 140 can be a switch, buck circuit, a boost circuit, a fly-back circuit, a SEPIC circuit, or a CUK circuit and the according inductors or transformers should be included.

It should be noted that when the power source 110 is a current source, the current provided by the power source 110 flows through the first path p1. If regulation module 130 is used to regulate the power applied to the LED 120 by the first switch L1, the first switch L1 can allow from 100% current provided from the power source 110 flowing through, to 0% current flowing through or a certain percentage current flowing through depending on the signal at the terminal 132. When L1 does not allow all current flowing through, the excess charges from the power source 110 will be accumulated on a node n. The accumulated charges on node n result in the voltage of the node n increase. The high voltage will damage the LED 120, the first switch L1 or entire the system 100. Subsequently, the regulation by the first regulation module 130 fails, resulting from erroneous voltage on the node n.

When the power source 110 is a voltage source, if the second regulation module 140 is in operation (the first switch L1 is fully on when the second regulation module 140 is in operation), due to the voltage power source 110 can deliver almost infinite current to the second switch L2 and the LED120, the regulation by the second regulation module 140 is not suitable, resulting from erroneous current consumption on the second path p2.

In FIG. 3, when the second regulation module 140 in operation and detects that the LED power is greater than the second reference value ref2, the second regulation module 140 uses the second switch L2 to bypass the excess current flows through the second path p2. By splitting current from the power source 110 into the current flowing through the LED 120 and the current flowing through the second switch L2, the second regulation module 140 can regulate the desired current to flow through the LED 120 because the undesired or excess current can be bypassed to flow through the second switch L2. But if the power source 110 is a voltage source, for example, an outlet, the power source 110 can deliver almost infinite current or beyond the capability of the second switch L2. Since the second switch L2 cannot bypass all undesired current, the LED 120 is not under regulation and the second regulation module 140 fails in regulation, the LED 120 and the first switch L1 could be damaged. Besides, the second switch L2 may be damaged too.

Referring to FIG. 3 again, the check module 150 is used to detect an energy value on the node n of the first path p1. When the check module 150 detects that the voltage of the node n is greater than a predefined value REF, it indicates that the regulation module in operation is not suitable for the power source 110 in operation. The control module 160 enables the other regulation module.

The check module 150 has a first input terminal 151, a second input terminal 152, and an output terminal 153. The input terminal 151 is connected to the node n to sense the power of the node n. The second input terminal 152 receives the predefined value REF. The output terminal 153 is connected to the control module 160.

The control module 160 is preferably a digital logic element. In this embodiment, the control module 160 comprises an input terminal, which includes a setting terminal S and a reset terminal R, and an output terminal Q. The setting terminal S is connected to the output terminal 153 of the check module 150. The reset terminal R is under UVLO control or power-on signal. When the whole system is turning on, the output terminal Q will be reset to 0. The output terminal Q is connected to the first monitor module 131 and the second monitor module 141. In this embodiment, once the system is powered on, UVLO will reset Q to be 0 to enable the first regulation module 130 first.

Figure 4A:
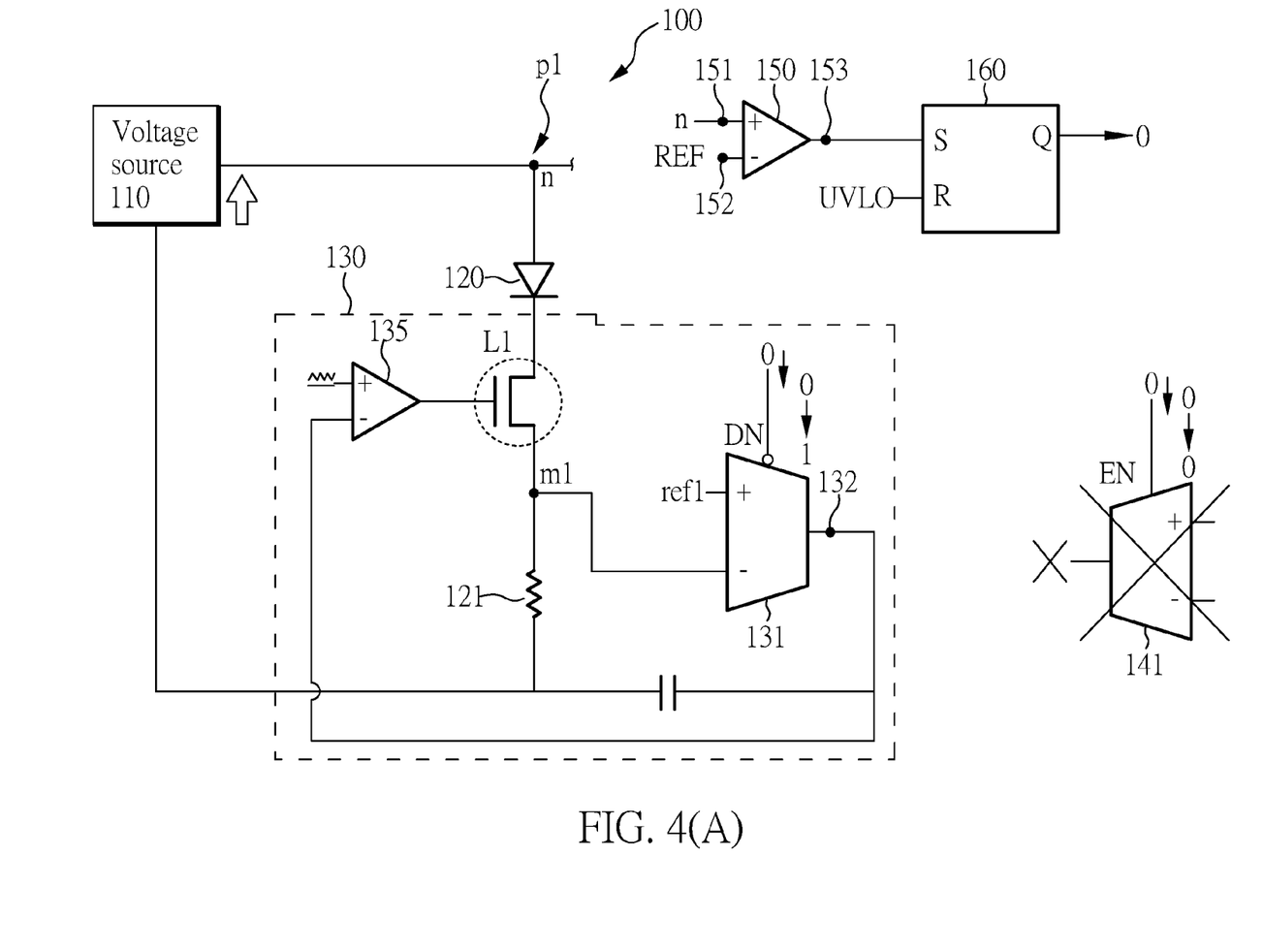
FIG. 4(A) is a schematic diagram illustrating a first operation mode of the circuit structure in FIG. 3.

FIG. 4(A) is a schematic diagram illustrating a first operation mode of the circuit structure in FIG. 3. The reset signal "0" is inputted to an inverted terminal DN of the first monitor module 131 to enable the first regulation module 130. The reset signal "0" is also inputted to the start terminal EN of the second monitor module 141 to disable the second regulation module 140. In this embodiment, the first regulation module 130 is defaulted to operate first.

The first input terminal 151 of the check module 150 is used to detect whether the voltage on the node n is abnormal. The predefined value REF is set to be a voltage value greater than a maximum voltage value of normal voltage source specification. Because the normal voltage range of the voltage source is 0V to 370V, the predefined value REF should be set to be greater than 370V, such as 500V. A resister divider will be preferred to bring voltage of the node n down. The comparator 150 can sense low voltages instead of 500 v.

If the voltage on the node n is less than the predefined value REF, it means the LED 120 is safe.

If the voltage is on the node n is greater than the predefined value REF, it means the power source 110 is current source and the first regulation module 130 is not suitable to be in operation.

Figure 4B:
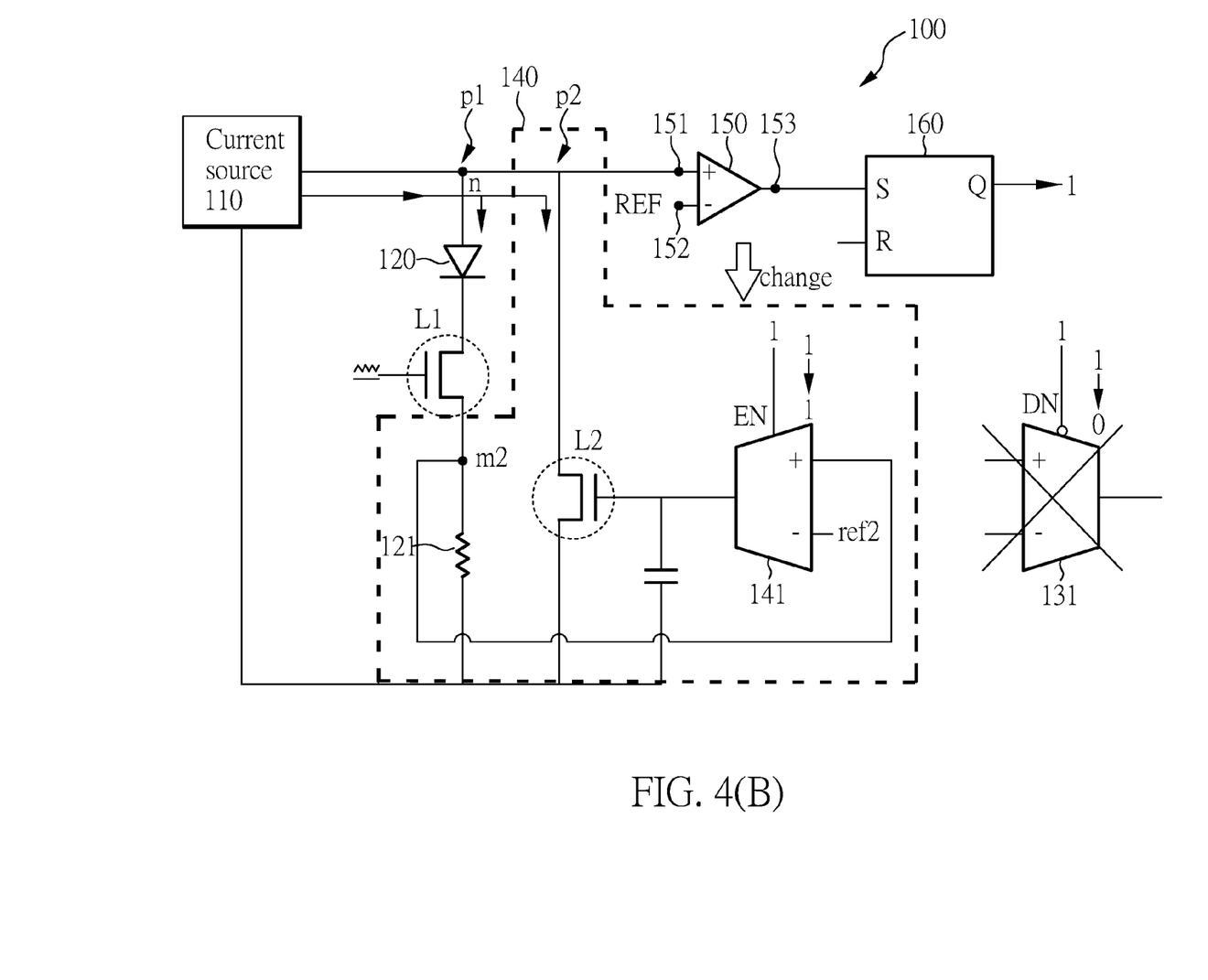
FIG. 4(B) is a schematic diagram illustrating a second operation mode of the circuit structure in FIG. 3.

FIG. 4(B) is a schematic diagram illustrating a second operation mode of the circuit structure in FIG. 3. When the check module 150 detects the voltage on the node n is greater than the predefined value REF, the check module 150 outputs a signal to the setting terminal S of the control module 160, then the control module 160 outputs the activating signal "1". The activating signal "1" is inputted to the start terminal DN of the first monitor module 131 to disable the first regulation module 130. The activating signal "1" is also inputted to the inverted start terminal EN of the second monitor module 141 to enable the second regulation module 140. Thus the second regulation module 140 being suitable for current source is in operation, the regulation of the power of the LED 120 can be normal.

In this embodiment, the check module 150 is preferably a comparator. The control module 160 is preferably an S-R latch. However, the aforesaid elements can be replaced by their equivalents by those skilled in the art.

As a result, if the power source 110 is not voltage source and the first regulation module 130 is in operation, the check module 150 would detect erroneous voltage. The control module 160 will disable the first regulation module 130 and enable the second regulation module 140 to ensure the LED control system 100 is in normal operation.

Figure 4C:
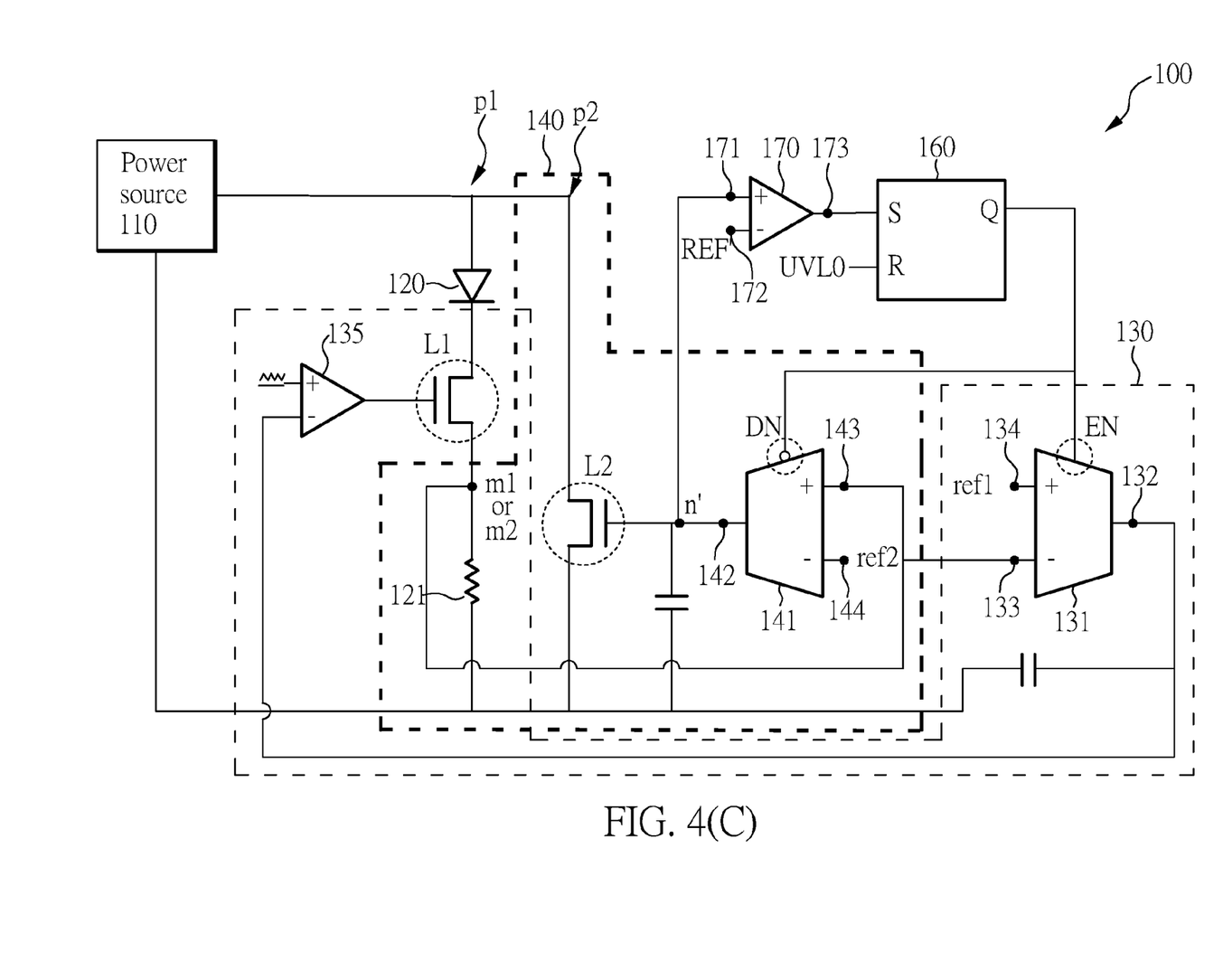
FIG. 4(C) is schematic diagram illustrating of another circuit structure of the invention.

In other embodiments, another check module 170 can be used to detect erroneous current. FIG. 4(C) is another circuit structure of the invention. Except the check module 150 is changed to the check module 170, and the output terminal is connected to an inversed terminal DN of the second monitor module 141 and a start terminal EN of the first monitor module 131, other units are same as the circuit structure in FIG. 3.

While the system 100 is powered on, the second regulation module 140 and check module 170 will be turned on first.

When the second regulation module 140 is in operation, if the power source 110 is not current source, the check module 170 can detect that a signal value on node n' is greater than the predefined value REF', and the control module 160 can disable the second regulation module 140 and enable the first regulation module 130.

It is noted that, in other embodiments, by modifying some logic controls, the first regulation module 130 and the second module 140 share a same monitor module, e.g. the first monitor module 131 and the second monitor module 141 can be a same monitor module to respectively connected to the first switch L1 and the second switch L2 to respectively control the first switch L1 and the second switch L2.

Thus, back to FIG. 2, when the regulation module in operation is not suitable for the power source in operation, either erroneous voltage or erroneous current can be detected, and the control module 160 can enable the other regulation module being suitable for the power source.

Figure 5:
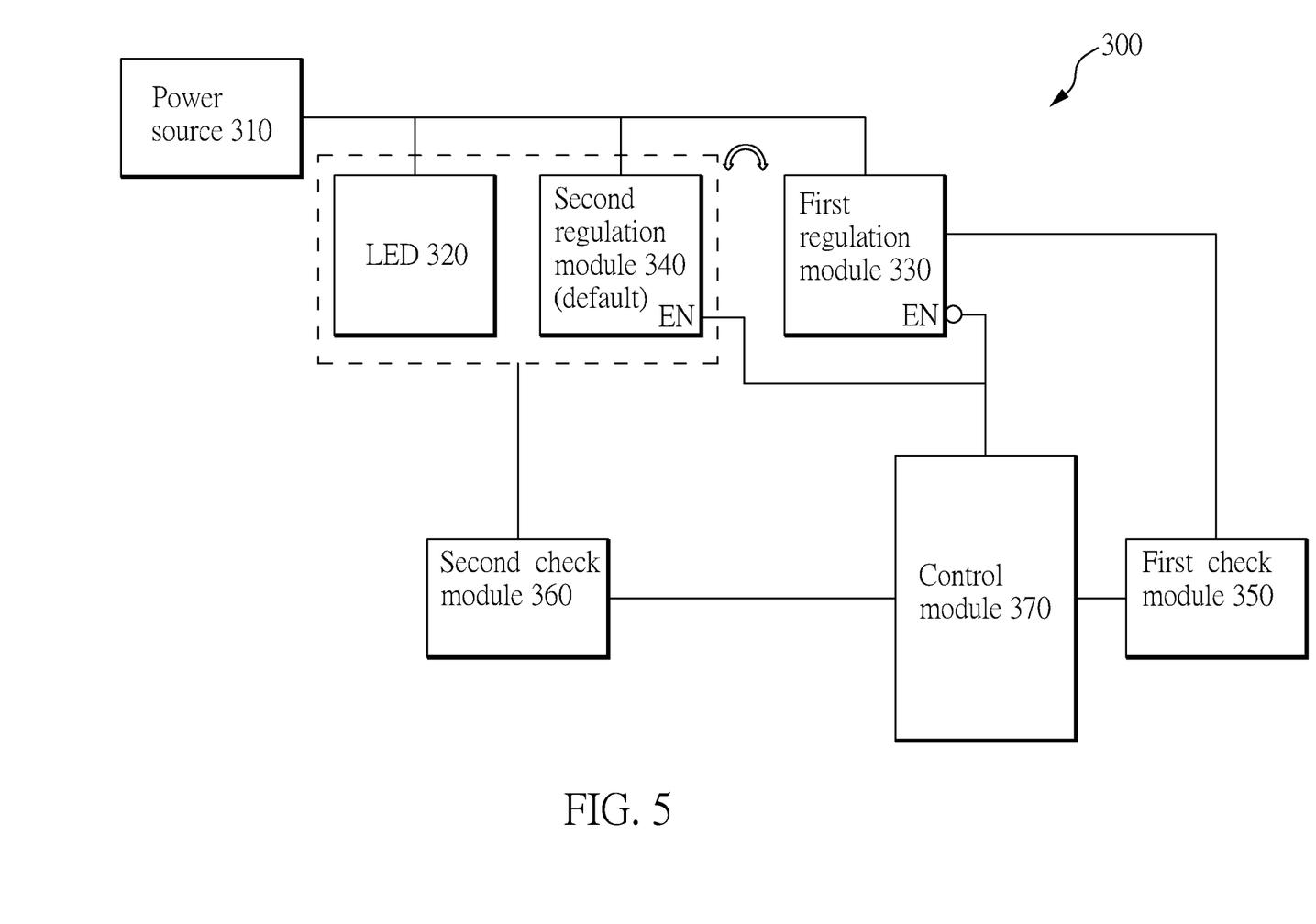
FIG. 5 is a schematic diagram illustrating a second system framework of an LED control system according to the present invention.

FIG. 5 is a schematic diagram illustrating a second system framework of an LED control system according to the present invention. As shown in FIG. 5, the LED control system 300 includes a power source 310, an LED 320, a first regulation module 330, a second regulation module 340, a first check module 350, a second check module 360, and a control module 370. The power source 310 is used to provide a power for lighting the LED 320. The first regulation module 330 and the second regulation module 340 are used to regulate a power applied to the LED 320. An operation period of the first regulation module 330 do not overlapped with that of the second regulation module 340 and vice versa. The control module 370 is connected to the first check module 350, the second check module 360, the first regulation module 330, and the second regulation module 340.

The type of power source 310 can be a voltage source or a current source. The first regulation module 330 and the second regulation module 340 are suitable for different types of power source 310. When the first check module 350 detects that the regulation module in operation is not suitable for the power source 310 in operation, the control module 370 enables the other regulation module. When the second check module 360 detects that the regulation module in operation is not suitable for the power source 310 in operation, the control module 370 enables the other regulation module. The first check module 350 and the second check module 360 can each be a voltage check module for detecting an erroneous voltage of the LED control system 300, alternatively, the first check module 350 and the second check module 360 can each be a current check module for detecting an erroneous current of the LED control system 300.

Figure 6:
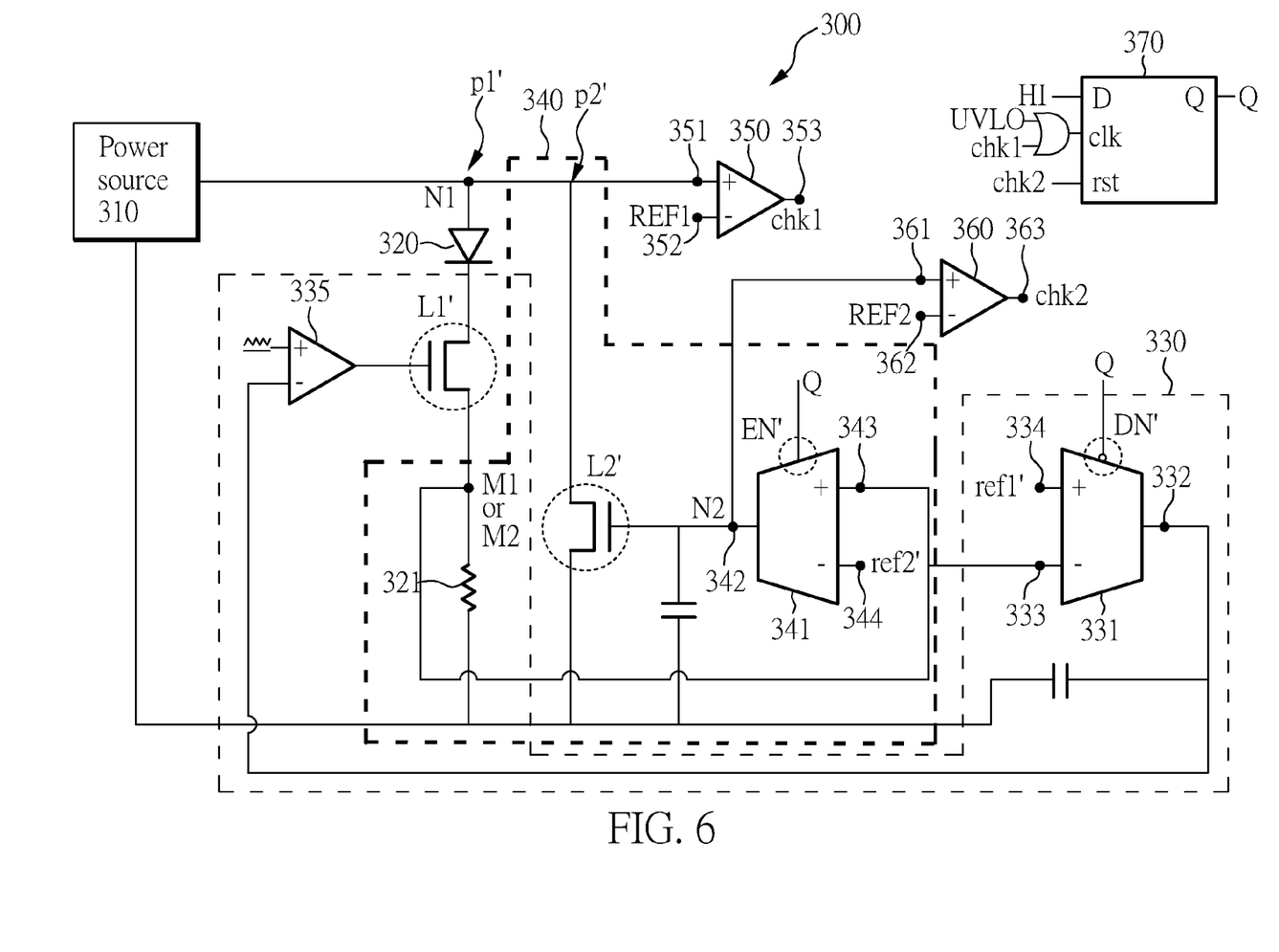
FIG. 6 is schematic diagram illustrating a preferred circuit structure of the second system framework of an LED control system according to the present invention.

FIG. 6 is schematic diagram illustrating a preferred circuit structure of the second system framework of an LED control system according to the present invention. Similar to the circuit structure of the first system framework of an LED control system according to the present invention, the LED 320 is disposed on a first path p1'. The LED 320 is connected to a power source 310. The LED 320 has an anode connected to a positive terminal of the power source 310 and a cathode connected to a first terminal of a first switch L1' disposed on the first path p1'. A second terminal of the first switch L1' is connected to a negative terminal of the power source 310 through a resistor. The LED 320 is connected in series with the first switch L1'.

The first switch L1' further includes a third terminal directly or indirectly connected to an output terminal 332 of a first monitor module 331 of the first regulation module 330. The first monitor module 331 controls the first switch L1'. The first monitor module 331 has two input terminals including an input terminal 333 and a reference input terminal 334. The input terminal 333 is connected to a first monitor node M1 of the first path p1' to sense the power applied to the LED 320. The sense result is compared with a first reference value ref1' inputted to the reference input terminal 334. Since the operations of the first monitor module 331 and that of the first switch L1' are similar to that of the circuit of the first system framework of an LED control system according to the present invention, their detailed descriptions will not be repeated here.

Referring to FIG. 6, the first regulation module 330 is formed by the first monitor module 331 and the first path p1'. The first regulation module 330 can regulate the power supplied to the LED 320 by means of changing conducting on/off ratio or duty cycle.

Preferably, the first regulation module 330 is a regulation circuit suitable for a voltage source because the first switch L1' is connected in series with the LED120. The first switch L1' includes at least a transistor. The third terminal of the first switch L1' is a gate terminal. The first monitor module 331 includes at least an amplifier. In this embodiment, the first regulation module 330 is a switch circuit. However, in other embodiments, the first regulation module 330 can be a LDO circuit, buck circuit, a boost circuit, a fly-back circuit, a SEPIC circuit, or a CUK circuit and the according inductors or transformers should be included.

Referring to FIG. 6 again, a part of the first path p1' is shared by the second regulation module 340 and the first regulation module 330. The second regulation module 340 further includes a second path p2' connected in parallel with the first path p1'. A second switch L2' is disposed on the second path p2'. The second switch L2' includes a first terminal, a second terminal, and a third terminal. The third terminal of the second switch L2' is directly or indirectly connected to an output terminal 342 of a second monitor module 341. The second switch L2' is controlled by the second monitor module 341.

Precisely, the first switch L1' and the LED 320 are connected in series with the first path p1', and the second switch L2' in the second path p2' are connected in parallel with the LED 320.

The first path p1' is defined as a current path passing through the LED 320, the first terminal and the second terminal of the first switch L1' and a resistor 321. The second path p2' is a current path passing through the first terminal and the second terminal of the second switch L2'.

The second monitor module 341 also has an input terminal 343 and a reference input terminal 344. The input terminal 343 is connected to a second monitor node M2 of the first path p1' to sense the power applied to the LED 320. The sense result is compared with a second reference value ref2' inputted to the reference input terminal 344. Since the operations of the second monitor module 341 and that of the second switch L2' are similar to that of the circuit of the first system framework of an LED control system according to the present invention, their detailed descriptions will not be repeated here.

In this embodiment, the first monitor node M1 is the same as the second monitor node M2. The first reference value ref1' is the same as the second reference value ref2'. Alternatively, in other embodiments, the first monitor node M1 may be different from the second monitor node M2. The first reference value ref1' may be different from the second reference value ref2'.

Preferably, the second regulation module 340 is a regulation circuit suitable for a current source because the second switch L2' is connected in parallel with the LED 320. The second switch L2' includes at least a transistor. The third terminal of the second switch L2' is a gate terminal. The second monitor module 341 includes at least an amplifier. In this embodiment, the second regulation module 340 is an LDO circuit. In other embodiments, the second regulation module 340 can be a switch, a buck circuit, a boost circuit, a fly-back circuit, an SEPIC circuit, or a CUK circuit and the according inductors or transformers should be included.

It is noted that, in some embodiments, by modifying some logic controls, the first regulation module 330 and the second module 340 share a same monitor module, e.g. the first monitor module 331 and the second monitor module 341 can be a same monitor module to respectively connected to the first switch L1' and the second switch L2' to respectively control the first switch L1' and the second switch L2'.

Similar to the circuit of the first system framework of an LED control system of the present invention, when the power source 310 is a current source, the first regulation module 330 is unable to operate normally. However, the second regulation module 340 can work well with the current source. When the power source 310 is a voltage source, the second regulation module 340 is unable to operate normally. On contrast, the first regulation module 330 co-operates with voltage source very well.

Referring to FIG. 6 again, the first check module 350 is used to detect an value on a first node N1 (can be regarded as to detect a power applied to the LED under the control of the first regulation module 330 from a first node N1). When the first check module 350 detects that the value on the first node N1 is greater than a first predefined value REF1, it indicates that the regulation module in operation is not suitable for the power source 310 in operation, and thus the control module 370 enables a different regulation module.

The second check module 360 is used to detect a value on the second node N2 (can be regarded as to detect a power applied to the LED under module the control of the second regulation module 340). When the second check module 360 detects that the value (signal value) on the second node N2 is greater than a second predefined value REF2, it indicates that the regulation module in operation is not suitable for the power source 310 in operation. The control module 370 enables a different regulation module.

In this embodiment, the second check module 360 is a current check module, it used to detect current violation on the system 300, and it is in operation when the second regulation module 340 is in operation. The first check module 350 is a voltage check module, it used to detect voltage violation on the system 300, and it is in operation when the first regulation module 330 is in operation.

The first check module 350 includes a first input terminal 351, a second input terminal 352, and an output terminal 353. The first input terminal 351 is connected to the first node N1 to sense voltage violation. The second input terminal 352 receives the first predefined value REF1. The output terminal 353 is connected to the control module 370. Although in this embodiment, the first check module 350 is used to check the voltage violation, however, in other embodiments, the first check module 350 can be checked any current or voltage violations in other embodiments.

The second check module 360 includes a first input terminal 361, a second input terminal 362, and an output terminal 363. The first input terminal 361 is connected to the second node N2 to sense current violation. The second input terminal 362 receives the second predefined value REF2. The output terminal 363 is connected to the control module 370. Although in this embodiment, the second check module 360 is used to check the current violation, however, in other embodiments, the second check module 360 can be checked any current or voltage violations.

The control module 370 is preferably a digital logic element. In this embodiment, the control module 370 comprises two input terminals including a clock terminal clk and a reset terminal rst, and an output terminal Q. The clock terminal clk receives a predetermined signal UVLO and a first output signal chk1 from the output terminal 353 of the first check module 350. The reset terminal rst receives a second output signal chk2 from the output terminal 363 of the second check module 360. The output terminal Q is preset to output a predetermined logic signal. The output terminal Q is connected to an inverted start terminal DN' of the first monitor module 331 and a start terminal EN' of the second monitor module 341. In this embodiment, since the predetermined signal UVLO is being inputted to the clock terminal clk, the control module 370 is predetermined to output an activating signal "1".

Although the second regulation module 340 is started first in this embodiment, but the first regulation module 330 can also be started first in other embodiments. It is noted that if the first regulation module 330 which is suitable for voltage source is started first, the first check module 350 should be in operation too, and if the second regulation module 340 which is suitable for current source is started first, the second check module 360 should be in operation.

When the power source 310 is a current source providing excess power, the second regulation module 340 controls the second switch L2' to allow the excess power to flow into the second path p2'. When the power source 310 is a voltage source be capable to provide infinite current, the second regulation module 340 cannot allow the excess power to flow into the second path p2'. At this moment, the second regulation module 340 does not operate normally.

Figure 7A:
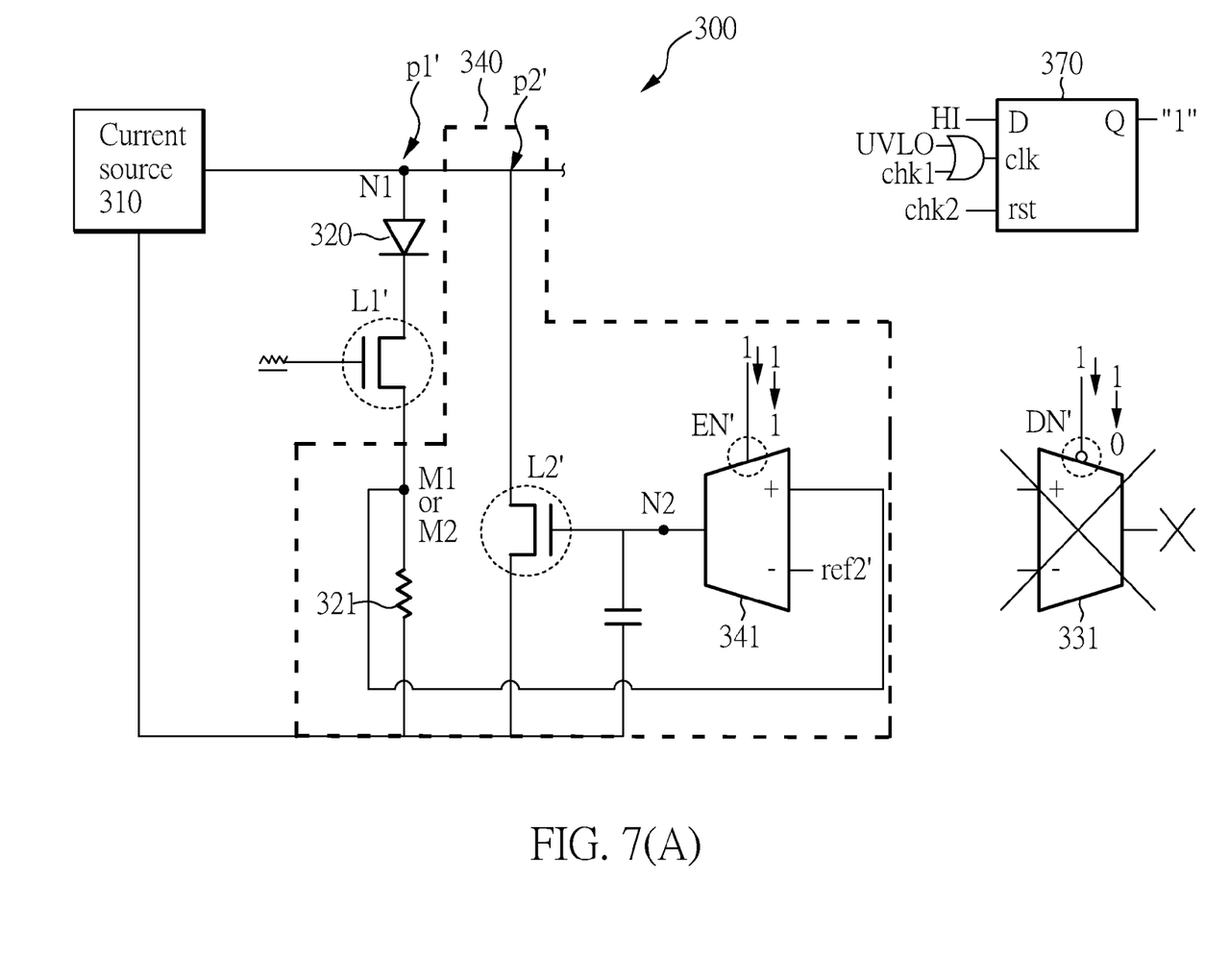
FIG. 7(A) is a schematic diagram illustrating a first operation mode of the circuit structure in FIG. 6.

FIG. 7(A) is a schematic diagram illustrating a first operation mode of the circuit structure in FIG. 6. In the beginning, The activating signal "1" is inputted to the inverted start terminal DN' of the first monitor module 331 to disable the first monitor module 331. The first regulation module 330 is inactivated but the first switch L1' is fully on.

The activating signal "1" is also inputted to the start terminal EN of the second monitor module 341 to enable the second monitor module 341. The second regulation module 340 is started. In this embodiment, the second regulation module 340 is defaulted to operate first.

During this first operation mode, when the power source 310 is a current source providing excess power, the second regulation module 340 controls the second switch L2' to allow the excess power to flow into the second path p2'. The operation of the second regulation module 340 is normal.

But when the power source 310 is a voltage source providing infinite excess power, the second regulation module 340 cannot regulate the excess power by the second path p2'. Thus, the second regulation module 340 operates abnormally. At this moment, the first input terminal 361 of the second check module 360 receives a signal value greater than the second predefined value REF2. The second check module 360 outputs the second output signal chk2 to the reset terminal rst of the control module 370 to cause the control module 370 to output a reset signal "0", as shown in FIG. 7(B).

Figure 7B:
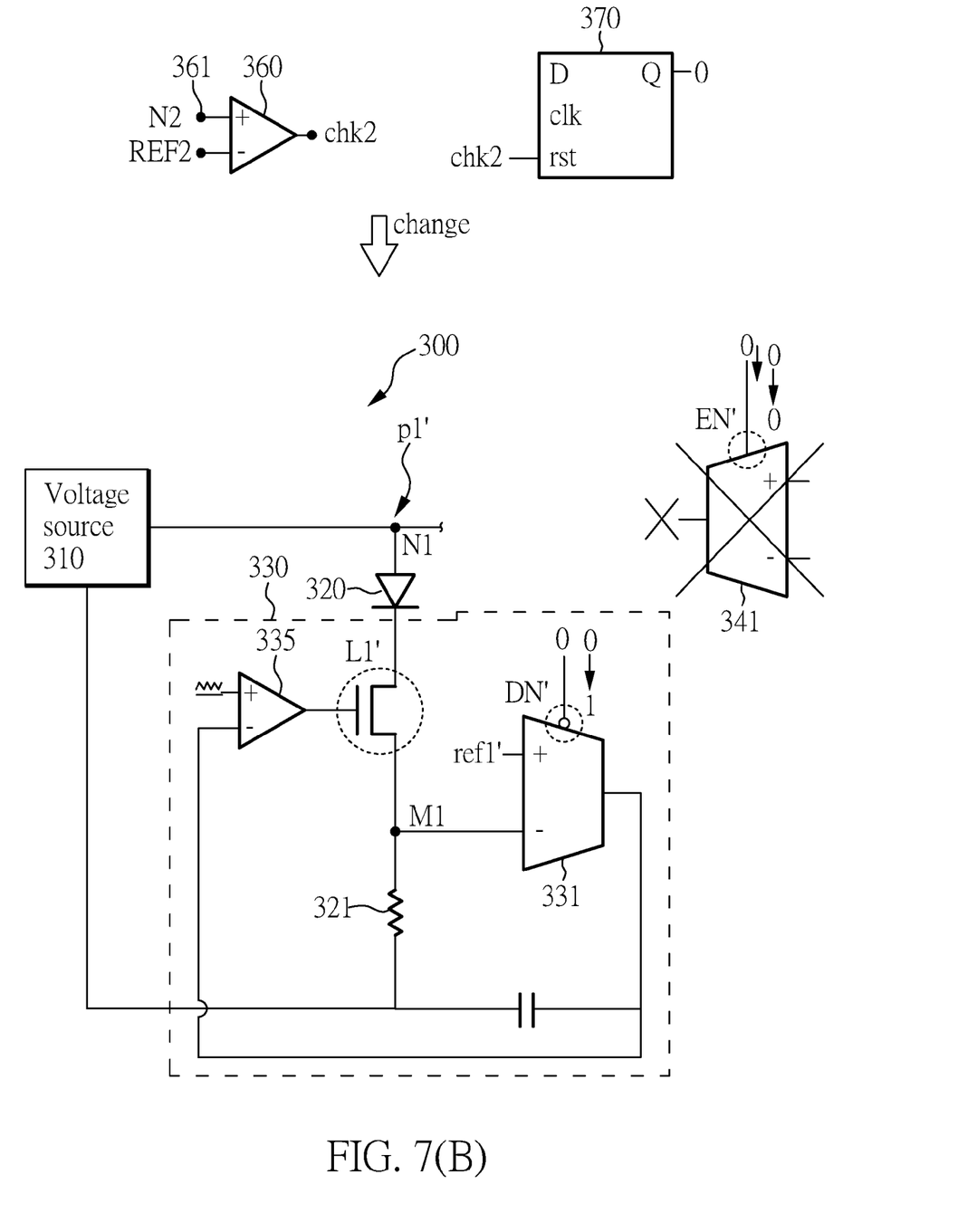
FIG. 7(B) is a schematic diagram illustrating a second operation mode of the circuit structure in FIG. 6.

FIG. 7(B) is a schematic diagram illustrating a second operation mode of the circuit structure in FIG. 6. The reset signal "0" is inputted to the inverted terminal DN' of the first monitor module 331 to enable the first monitor module 331. The first regulation module 330 is started. The reset signal "0" is also inputted to the start terminal EN' of the second monitor module 341 to disable the second monitor module 341. The second regulation module 340 is inactivated. The first regulation module 330 suitable for a voltage source is operated normally. The first switch L1' turns on and off by different ratio to adjust the current flowing through the LED 320.

If the power source 310 is replaced with a current source after the first regulation module 330 has been activated, the excess power provided by the current source cannot be consumed by the first switch L1'. The first regulation module 330 will operate abnormally. The first input terminal 351 of the first check module 350 receives a voltage greater than the first predefined value REF1. The first check module 350 outputs the first output signal chk1 to the clock terminal clk of the control module 370 to cause the control module 370 to output an activating signal "1", as shown in FIG. 7(C).

Figure 7C:
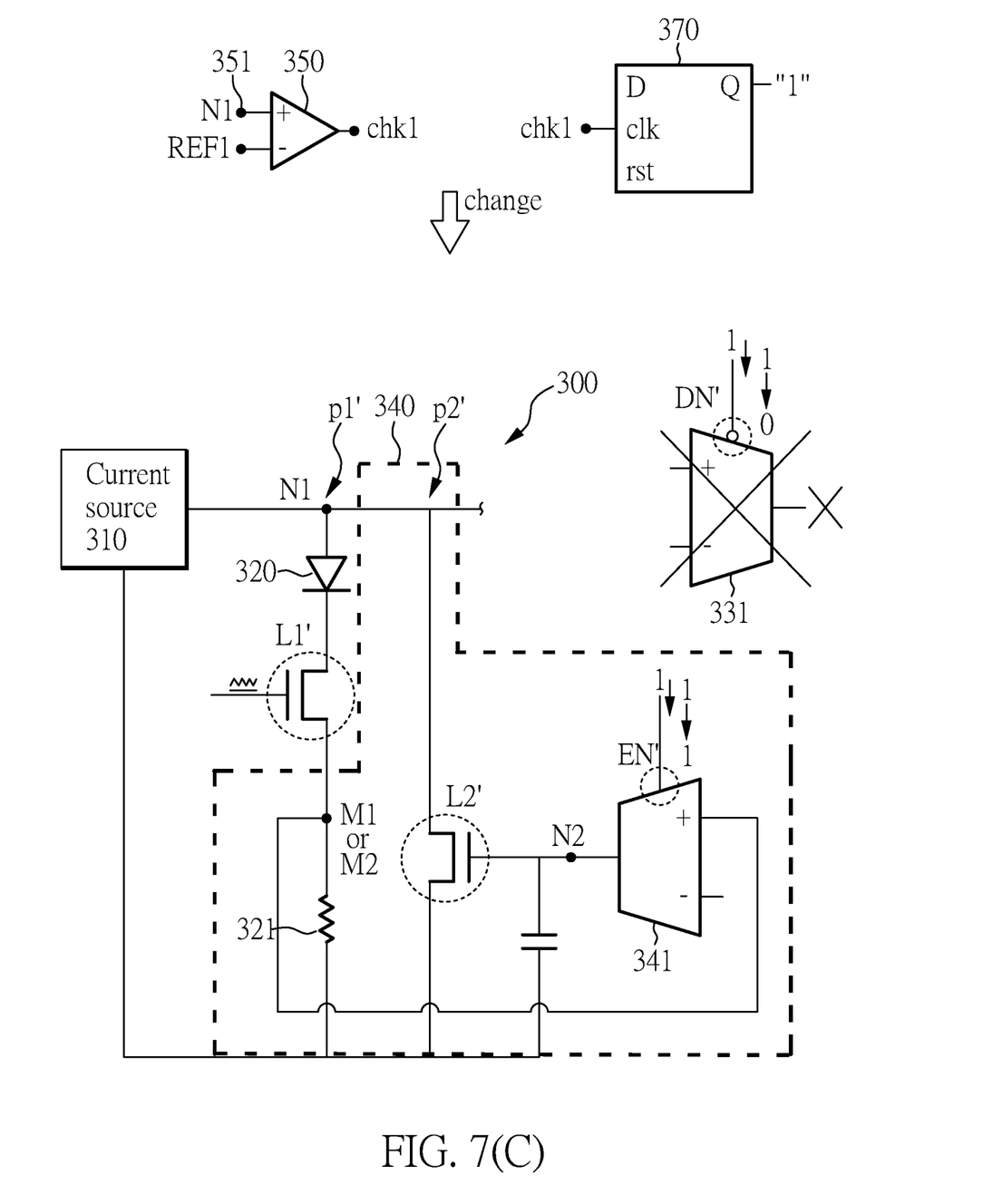
FIG. 7(C) is a schematic diagram illustrating a third operation mode of the circuit structure in FIG. 6.

FIG. 7(C) is a schematic diagram illustrating a third operation mode of the circuit structure in FIG. 6. When the activating signal "1" is inputted to the start terminal EN' of the second monitor module 341, the second monitor module 341 is enabled again, and the second regulation module 340 is activated. The activating signal "1" is also inputted to the inactivating terminal DN' of the first monitor module 331 to disable the first monitor module 331. The first regulation module 330 is inactivated again. Hence, the second regulation module 340 suitable for a current source can operate again. The excess power can flow into the second path p2' to prevent the LED 320 from being damaged by the excess power.

It is noted that, in other embodiments, those skilled in the art can modify the circuit to first start the first regulation module 330, for example, by replacing the inverted terminal DN' of the first monitor module 330 with the start terminal EN', replacing the start terminal EN of the second monitor module 340 with the inverted start terminal DN' and connecting the first check module 350 to the reset terminal rst, and connecting the second check module 360 to the clock terminal clk.

Preferably, the first check module 350 and the second check module 360 are each a comparator. The control module 370 is preferably a D flip-flop. However, those skilled in the art can replace the above-mentioned components with their equivalents.

Accordingly, when the regulation module in operation is not suitable for the type of power source in operation, the LED control system of the present invention can switch and change the regulation module to ensure normal operation of the LED control system. Moreover, when the type of power source is changed, the LED control system can switch and change the regulation module again for normal operation. Thereby, the LED control system of the present invention can be suitable for any types of power source. Consequently, the excess power provided by the power source can be regulated by the regulation modules. The LED can be prevented from being damaged by the excess power provided by the power source.

Although the present invention has been explained in relation to its preferred embodiments, it is to be understood that many other possible modifications and variations can be made without departing from the spirit and scope of the invention as hereinafter claimed.

What is claimed is:

1. An LED control system, comprising:
   a power source;
   an LED connected to the power source;
   a first switch connected in series with the LED;
   a second switch connected in parallel with the LED;
   a first regulation module including the first switch to regulate a power applied to the LED;
   a second regulation module including the second switch to regulate the power applied to the LED, wherein an operating period of the first regulation module and an operating period of the second regulation module do not overlapped with each other;
   a check module to detect an energy value on a node of the LED control system; and
   a control module connected to the check module, the first regulation module, and the second regulation module;
   wherein when the check module detects that the energy value on the node is greater than a predefined value, the control module disables the regulation module in operation and enables the other regulation module.

2. The LED control system of claim 1, wherein the control module comprises an input terminal and an output terminal, the input terminal of the control module being connected to the check module, and the output terminal of the control module being preset to output a predetermined logic signal.

3. The LED control system of claim 2, wherein the first regulation module has a first terminal connected to the output terminal of the control module, and the second regulation module has a second terminal connected to the output terminal of the control module, the first terminal being inverse to the second terminal.

4. The LED control system of claim 3, wherein when the check module detects that the energy value on the node is greater than the predefined value, the check module outputs a signal to a setting terminal of the control module to cause the control module to output a logic signal with a voltage level state opposite to the voltage level state of the predetermined logic signal.

5. The LED control system of claim 1, wherein the LED and the first switch are disposed on a first path, the second switch is disposed on a second path connected in parallel with the first path.

6. The LED control system of claim 5, wherein the first regulation module further includes a first monitor module having an input terminal connected to a first monitor node of the first path to receive a power applied to the first monitor node, and an output terminal directly or indirectly connected to the first switch.

7. The LED control system of claim 6, wherein when the power applied to the first monitor node is greater than the first reference value, the first monitor module outputs a first regulation signal to control the first switch.

8. The LED control system of claim 5, wherein the second regulation module further includes the second path, and a second monitor module having an input terminal connected to a second monitor node to receive a power applied to the second monitor node and an output terminal directly or indirectly connected to the second switch.

9. The LED control system of claim 8, wherein when the power applied to the second monitor node is greater than the second reference value, the second monitor module outputs a second regulation signal to control the second switch.

10. The LED control system of claim 1, wherein the check module is a voltage detect module or a current detect module.

11. An LED control system, comprising:
a power source;
an LED connected to the power source;
a first switch connected in series with the LED;
a second switch connected in parallel with the LED;
a first regulation module including the first switch to regulate a power applied to the LED;
a second regulation module including the second switch to regulate the power applied to the LED, wherein an operating period of the first regulation module and an operating period of the second regulation module do not overlapped with each other;
a first check module to detect an energy value on a first node of the LED control system;
a second check module to detect an energy value on a second node of the LED control system; and
a control module connected to the first check module, the second check module, the first regulation module, and the second regulation module;
wherein when the first check module detects that the energy value on the first node is greater than a first predefined value, the control module disables the first regulation module and enables the second regulation module, and when the second check module detects that the energy value on the second node is greater than a second predefined value, the control module disables the second regulation module and enables the first regulation module.

12. The LED control system of claim 11, wherein the control module includes a first terminal connected to the second check module, a second terminal connected to the first check module, and an output terminal.

13. The LED control system of claim 12, wherein the first regulation module has a first terminal connected to the output terminal of the control module, and the second regulation module has a second terminal connected to the output terminal of the control module, the first terminal of the first regulation module being inverse to the second terminal of the second regulation module.

14. The LED control system of claim 13, wherein when the first check module detects that the energy value on the first node is greater than the first predefined value, the first check module outputs a first output signal to the control module to cause the control module to output a first logic signal.

15. The LED control system of claim 14, wherein when the second power module detects that the energy value on the second node is greater than the second predefined value, the second check module outputs a second output signal to the control module to cause the control module to output a second logic signal with a voltage level state opposite to a voltage level state of the first logic signal.

16. The LED control system of claim 11, wherein the LED and the first switch are disposed on a first path, the second switch is disposed on a second path connected in parallel with the first path.

17. The LED control system of claim 16, wherein the first regulation module further includes a first monitor module having an input terminal connected to a first monitor node of the first path to receive a power applied to the first monitor node, and an output terminal directly or indirectly connected to the first switch, and when the power applied to the first monitor node is greater than the first reference value, the first monitor module outputs a first regulation signal to control the first switch.

18. The LED control system of claim 16, wherein the second regulation module further includes the second path, and a second monitor module having an input terminal connected to a second monitor node to receive a power applied to the second monitor node and an output terminal directly or indirectly connected to the second switch, and when the power applied to the second monitor node is greater than the second reference value, the second monitor module outputs a second regulation signal to control the second switch.

19. The LED control system of claim 11, wherein the first check module is a voltage check module or a current check module, and the second check module is a voltage check module or a current check module.

* * * * *